United States Patent Office 3,759,861
Patented Sept. 18, 1973

3,759,861
POLYMER COMPLEX OF A CARBOXY-CONTAINING POLYMER AND A NONIONIC CATIONIC OR AMPHOTERIC SURFACE ACTIVE AGENT
Wataru Shimokawa, 1-1-1-303 Sakurajosui, Tokyo, Japan
No Drawing. Filed Dec. 18, 1970, Ser. No. 99,715
Claims priority, application Japan, Dec. 20, 1969, 44/102,779; Apr. 10, 1970, 45/30,645
Int. Cl. C08f 45/24, 45/42
U.S. Cl. 260—31.4 R
21 Claims

ABSTRACT OF THE DISCLOSURE

A polymer complex obtained by reacting a vinyl polymer having carboxyl groups and at least one nonionic, cationic or amphoteric surface active agent. The complex is water-soluble and useful as a sizing agent for the paper industry. It is also useful as a flucculant or a heat-sensitive or pressure-sensitive adhesive.

---

The present invention relates to a novel polymer complex comprising a vinyl polymer having carboxyl groups and a surface active agent.

Hitherto, it has been known that an anionic surface active agent such as a sulfuric acid ester of higher alcohol and a water-insoluble polymer such as polyvinyl acetate can be mutually reacted to form a water-soluble resinous composition. The materials are ordinarily reacted in an amount less than about 30 parts by weight of the water-insoluble polymer to 100 parts by weight of the anionic surface active agent.

The composition is not formed by the water-insoluble polymer becoming an emulsified material with the anionic surface active agent and then dispersing or emulsifying into water, but by completely dissolving into water to form a true aqueous solution.

Although the real mechanism of this phenomenon has not been understood at the present time, it will be supposed that it forms a kind of complex from the polymer and surface active agent (hereinafter referred to as polymer complex). These water-soluble resinous compositions are useful as a sizing agent for paper.

However, nonionic, cationic and amphoteric surface active agents do not form any water-soluble polymer complex together with a water-insoluble polymer such as polyvinyl acetate. Even if so, it will be a very small quantity.

If there may be formed a water-soluble polymer complex from a nonionic, cationic or amphoteric surface active agent and a water-insoluble polymer, it will be possible to apply for various purposes which one formed from an anionic surface active agent could not be applied for.

For example, one formed from a cationic surface active agent will have superior flocculating effect against a material being negatively charged in water, such as pulp or cellulose. One formed from an amphoteric surface active agent will be able to be used as an anti-static agent, flocculant, dispersing agent and sizing agent for paper. One formed from a nonionic surface active agent will have superior mixing stability as well as adhesiveness, and therefore will be able to be used for an adhesive, thickening agent, dissolution accelerator and flocculant.

An object of the present invention is to provide a novel water-soluble polymer complex.

Another object of the invention is to provide a water-soluble polymer complex having superior mixing stability with pigment and superior adsorption on fiber.

Further object of the invention is to provide a water-soluble polymer complex having superior effect as a flocculant.

Still further object of the invention is to provide a polymer complex having superior anti-static property.

Still more further object of the invention is to provide a polymer complex having superior adhesiveness, particularly superior pressure-sensitive and heat-sensitive adhesiveness.

These and other objects of the invention will be apparent in the description hereinafter and in claims.

There has now been found that these objects of the invention can be achieved by combining a vinyl polymer having carboxyl group with a nonionic, cationic or amphoteric surface active agent.

That is, a vinyl polymer having carboxyl group in the molecule can also be mutually reacted with other surface active agent than anionic surface active agent to form a water-soluble polymer complex.

Moreover, the water-soluble polymer complex formed by combining a water-insoluble vinyl polymer having carboxyl group with a nonionic, cationic or amphoteric surface active agent shows high mixed ratio of both components such as 80 parts by weight of the polymer to 100 parts by weight of the surface active agent, and further the polymer can be mixed in higher ratio, for example, 500 parts, if it is possible to disregard the transparency of the aqueous solution.

The polymer having carboxyl group is a copolymer of one or more monomer units of the General Formula I;

$$\begin{array}{c} H \ \ R_1 \\ | \ \ \ | \\ -C-C- \\ | \ \ \ | \\ H \ \ R_1 \end{array} \qquad (I)$$

wherein $R_1$ is H, Cl or $CH_3$; $R_2$ is H, Cl, $CH_3$, $—OCOR_3$, $—OR_3$, $—COOR_3$,

$—CN$, $—CONH_2$, $—CONHCH_2OH$, $—CH_2OH$, $—CH_2—CH_2OH$, OH or

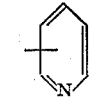

$R_3$ is an alkyl group having 1 to 8 carbon atoms, and one or more monomer units of the General Formula II:

$$\begin{array}{c} X \ \ Z \\ | \ \ \ | \\ -C-C- \\ | \ \ \ | \\ Y \ \ COOH \end{array} \qquad (II)$$

wherein X, Y and Z are, the same or different, each H, $CH_3$, $—COR_4$ or $—COOH$; $R_4$ is an alkyl group having 1 to 4 carbon atoms.

The said polymer may be prepared by copolymerizing one or more kinds of monomer having carboxyl group, for example, an unsaturated carboxylic acid, such as an unsaturated monocarboxylic acid, e.g. acrylic acid, methacrylic acid or crotonic acid, an unsaturated dicarboxylic acid, e.g. maleic acid, itaconic acid, aconitic acid or fumalic acid, or a half ester of the unsaturated dicarboxylic acid with one or more kinds of vinyl monomer having no carboxyl group, for example, various vinyl monomers, such as an acrylic acid ester, e.g. methyl acrylate, ethyl acrylate or butyl acrylate; a methacrylic acid ester, e.g. methyl methacrylate, ethyl methacrylate or butyl methacrylate; a crotonic acid este r, e.g. methyl crotonate, ethyl crotonate or butyl crotonate; acrylnitrile; an unsaturated acid amide, e.g. acrylamide, methacrylamide or crotonamide; an aromatic vinyl compound, e.g. styrene or α-methylstyrene; a vinyl halide, e.g. vinyl chloride or vinylidene chloride; a vinyl ester, e.g. vinyl formate, vinyl acetate, vinyl propionate, vinyl butyrate, vinyl versatate or vinyl stearate; a N- methylol unsaturated acid amide, e.g. N-methylol acrylamide, N-methylol methacrylamide or N-methylol crotonamide; and other vinyl monomer, e.g. glycidyl methacrylate, ethylene, propylene or dibutyl maleate, by a conventional polymerization system, such as solution polymerization, bulk polymerization, suspension polymerization or emulsion polymerization.

The polymer may be a partially or completely hydrolyzed compound of the copolymer of a vinyl ester and an unsaturated carboxylic acid, or an acetal compound thereof. The polymer may be further prepared by hydrolyzing a polymer of an unsaturated carboxylic acid ester, such as acrylic acid ester, methacrylic acid ester or crotonic acid ester, or the copolymer of a monomer having no carboxyl group and the said unsaturated carboxylic acid ester, and thereby their ester group being partially or completely converted into free carboxyl group.

According to the present invention, there may be also used a water-soluble polymer as the polymer having carboxyl group. The polymer complex prepared by reacting the water-soluble polymer having carboxyl group with a nonionic, cationic or amphoteric surface active agent shows the same superior effects as those of the polymer complex employing a water-insoluble polymer having carboxyl group instead of the said water-soluble polymer. Such superior effects have never been achieved by any water-soluble polymer having carboxyl group alone.

The most important fact is that the polymer having carboxyl group must from a polymer complex with the surface active agent.

Whether the polymer complex is formed or not can be determined by the facts that the vinyl polymer, when it is water-insoluble, becomes a water-soluble substance according to the complex reaction, and thereby is able to form a uniform aqueous solution, and that when the vinyl polymer is water soluble, the viscosity of the aqueous solution is changed by the complex reaction, and if the complex reaction does not take place, a phase separation occurs.

For preparing the polymer complex, the ratio of the carboxyl group in the vinyl polymer is restricted. That is, it is preferably that the value of the following expression stands in the range of 1 to 60.

$$\frac{m}{n+m} \times 100$$

where $n$ and $m$ are a molar number unit of the said Formula I and that of the said Formula II, respectively. When X, Y or Z of the formula is —COOH, it should be also noted that the ratio will be somewhat affected by it.

When the value is less than 1 or more than 60, the complex reaction will be insufficient and therefore the compatibility will be bad.

The polymer having carboxyl group may be used in various forms of aqueous or solvent solution, dispersion, suspension and solid (powder, film or flake), but preferably in a form of solution since the complex reaction can be readily carried out.

The solvent may be conventional organic solvents, and further water-soluble solvents are especially preferable. If the solvent can not be used, it may be preferably used in a form of dispersion.

As the dispersion, one using a water-soluble protective colloid, such as polyvinyl alcohol, polyvinylpyrrolidone, hydroxyethyl cellulose, polyacrylic acid, polyacrylamide, poly(N-methylol acrylamide), or the like is preferable in view of the velocity of compatibility with the surface active agent, the transparency of the aqueous composition, the solubility of the film of the composition and adhesiveness.

Furthermore, there is an advantage that it may be reacted with any ionic surface active agent since the polymer dispersion is neutral in ionic property. In case the said dispersion comprises a water-soluble protective colloid as emulsifier and a polymer which contains an acrylic acid ester unit of more than 50% by weight, it may be preferable to use a solvent such as carbon tetrachloride together with the water-soluble protective colloid for obtaining the desired polymer dispersion. And further, in case polyvinyl alcohol is used, it may be preferable to use a polyvinyl butyral for obtaining the desired polymer dispersion.

As the surface active agent in the present invention, a nonionic, cationic or amphoteric one is used.

As the nonionic surface active agent, there may be preferably used one containing polyoxyethylene as its hydrophilic component. The said nonionic surface acitve agent is exemplified by polyoxyethylene alkyl ether; polyoxyethylene alkylphenyl ether; polyoxyethylene alkyl ester; the compounds of the general formula:

$$RA(C_2H_4O)_eH$$

wherein R is an alkyl group having 6 to 18 carbon atoms, an alkylphenyl group in which the alkyl group has 4 to 20 carbon atoms or the group of the formula:

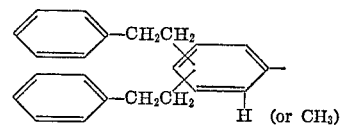

A is —O—, —S—, —COO—, —CONH— or —PO$_4$H— and $e$ is an integer of 2 to 80, inclusive; the group of the general formula:

$$HO(C_2H_4O)_a(C_3H_6)_b(C_2H_4O)_cH$$

wherein $a$, $b$ and $c$ are an integer of 20 to 80, inclusive; and the group of the general formula:

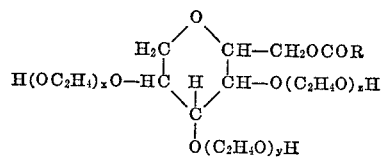

wherein R is an alkyl group having 6 to 18 carbon atoms and $x$, $y$ and $z$ are an integer of 2 to 40, inclusive.

As the cationic surface active agent, there may be preferably used that of alkyl ammonium chloride type, because it can best increase velocity of compatibility. The said alkyl ammonium chloride type cationic surface active agent is exemplified by lauryl-trimethylammonium chloride, lauryl-triethylammonium chloride and stearyl-trimethylammonium chloride.

As the amphoteric surface active agent, there may be preferably used alkylcarboxylic acid type one such as N-alkyl-$\beta$-aminopropionic acid and its alkali metal salt, N-alkyl-$\beta$-iminodipropionic acid and its alkali metal salt, alkyldimethylpropionic acid and its ammonium or alkali metal salt, and N-methyl-alkyltauric acid and its alkali metal salt.

These surface active agents can be used in any assortment as far as they are of the same kind. Moreover, they can be used in combination with different kinds of the agents excepting those having counter-ionic properties. It should also be noted in this connection that nonionic and amphoteric surface active agents may be used in combination with an anionic surface active agent.

When the vinyl polymer is water-insoluble, the polymer complex formation ratio is about 5 to 80 parts by weight of the vinyl polymer having carboxyl group to 100 parts by weight of the surface active agent, and within the range the desired water-soluble complex is obtained. When the vinyl polymer is water-soluble, the complex is obtained unless phase-separation occurs and generally the range of the polymer complex formation ratio is far wider than the one mentioned above. The polymer complex formation ratio may be determined in accordance with the properties required of the formed polymer complex.

The present polymer complex may be also prepared, for example, by mixing uniformly a powder of the above defined polymer and a powder of the above defined surface active agent. Although the composition thus prepared is still a mixture and does not yet form a polymer complex, it can readily be caused to form the polymer complex by adding it into water or an organic solvent, if necessary, with heating.

Generally, the present polymer complex can be prepared by adding the polymer in a form of aqueous dispersion, aqueous solution, organic solvent solution, powder, film or flake into the aqueous or organic solvent solution of the surface active agent.

It can be also prepared by adding the surface active agent or its aqueous or organic solvent solution into an aqueous dispersion, aqueous solution or organic solvent solution of the polymer. Furthermore, it can be also prepared by adding simultaneosly both the polymer and the surface active agent into water or organic solvent. Most preferably, to a solution of the surface active agent in water or an organic solvent is added a solution of the polymer in water or an organic solvent. If there is any problem in the use of an organic solvent and when the polymer is insoluble in water, it will be preferable to add an aqueous dispersion of the polymer into an aqueous solution of the surface active agent.

The said polymer complex in a form of solution can quickly be obtained under warming. In this case, the temperature may be selected from the range of about 60° to about 70° C.

All of the present polymer complex show superior flocculating effect, and the polymer complex prepared by using a cationic surface active agent shows extremely superior property as a flocculant for particles of suspension. Since the polymer complex is a mutual complex of an anionic polymer having carboxyl group and a cationic surface active agent, contrary to a natural or synthetic polymer electrolytes, such as polyacrylamide, poly (sodium acrylate), sodium carboxymethyl cellulose, denatured starch, sodium arginate and urea-formaldehyde pre-condensate, and a polyvalent cation, such as aluminium sulfate, ferrous sulfate and ferric sulfate, the composition has a strong activity against particles of suspension and readily make the particles of suspension flocculate and then precipitate.

Particularly, the present polymer complex has an excellent effect for talc and clay which is difficult to flocculate by conventional methods. Moreover, the present polymer complex shows cationic property as a whole when it is dissolved into water, and therefore is able to show an extremely superior flocculating effect against an anionic suspension particles, such as sodium lignin sulfonate contained in SP-drainage produced in paper company. To promote the flocculating effect, it may also be used together with a conventional natural or synthetic polymer electrolyte flocculant or polyvalent cation, such as aluminium sulfate and ferrous sulfate.

The polymer complex prepared by using the amphoteric surface active agent is useful as an antistatic agent, flocculant, dispersing agent, sizing agent for paper and the like.

The composition prepared by using the nonionic surface active agent is useful as an adhesive, flocculant, dispersing agent, sizing agent for paper, and the like.

It is particularly important that the polymer complex comprising a nonionic surface active agent and a polymer having carboxyl group shows superior adhesiveness. The adhesive is a hydrophilic pressure-sensitive or heat-sensitive one. For the preparation of such adhesive, the ratio of the polymer having carboxyl group and the nonionic surface active agent should be selected from the range of 5 to 500 parts, preferably 20 to 200 parts by weight (in solid) of the polymer to 100 parts by weight of the surface active agent. In case the polymer ratio is less than 5 parts by weight, the composition obtained loses its adhesiveness or cohesive strength. In case the polymer ratio is more than 500 parts by weight, the composition obtained loses its pressure-sensitivity or heat-sensitivity. If a water-insoluble polymer is used in the latter case, the composition obtained does not even show hydrophilic property.

A surface active agent having a polyethyleneoxide unit as a hydrophilic component can also be used.

The adhesive can be prepared by dissolving both components defined above mutually, in which water or organic solvent is used if any solvent is necessary for the mutual dissolution or dilution of the composition.

One of the superior characteristics of such a hydrophilic adhesive is that it shows durable adhering force by the action of both the nonionic surface active agent and the vinyl polymer. Any durable adhering force can not be achieved using another kind of surface active agent.

Other characteristic is that by selecting properly quantity and kind of the nonionic surface active agent and the vinyl polymer there can be prepared various compositions, such as easily water-soluble compositions as shown in Examples 40 to 45, and compositions which show proper solubility, e.g. being able to be dispersed in water or being able to be swollen with water, as shown in Examples 46 to 50.

Another characteristic is that if the nonionic surface active agent used or the resinous component prepared is in liquid form, the hydrophilic adhesive obtained shows tackiness at room temperature, and if it is solid, the hydrophilic adhesive obtained shows tackiness upon heating. Therefore, by selecting the nonionic surface active agent having proper property, a hydrophilic pressure-sensitive adhesive or a hydrophilic heat-sensitive adhesive can be readily obtained.

The present adhesive has further advantages in that it can be applied on wet surfaces since it is hydrophilic, that it has high moisture-permeability and water absorption power, that the removal or cleaning of the adhesive can be easily done by using water, that there is no danger such as toxicity or inflammability since an organic solvent may be not necessarily used, and that it has good adhesiveness to plastics.

To the present adhesive may be optionally added hygroscopic agents, such as water-soluble polyvalent alcohol, e.g. glycerine, ethyleneglycol or propyleneglycol, and urea, cross linking agents being able to react with carboxyl group, such as zinc acetate and magnesium chloride, water-soluble polymers, such as polyvinyl alcohol and poly(sodium acrylate) and alkaline substance for controlling the pH value, such as soidum hydroxide, potassium hydroxide and aqueous ammonia.

In the preparation of the adhesive, the vinyl polymer having carboxyl group is dissolved or dispersed in water or an organic solvent and then the temperature is elevated up to about 60° to about 70° C. To the solution is gradually added the nonionic surface active agent under agitation. Then, if necessary, a cross linking agent, hygroscopic agent and other additives are added, and the mixture is further agitated for 1 hour to give the desired adhesive. In this method, the use of an organic solvent and heating at 60° to 70° C. are for the purpose of obtaining the hydrophilic adhesive more quickly and not necessarily essential.

The following examples illustrate in detail the present invention but it is not limited to them. Examples 1 to 39 relate to resinous compositions comprising various assortments of a polymer having carboxyl group and a nonionic, cationic or amphoteric surface active agent.

EXAMPLE 1

92 parts by weight of ethyl acrylate and 8 parts by weight of methacrylic acid were emulsion-ploymerized in the presence of 7 parts by weight of polyoxyethylene laurylphenyl ether (HLB 16) to give a milky white aqueous dispersion of water-insoluble copolymer which has a concentration of 25% by weight and a pH value of 8. 16 parts by weight of the aqueous dispersion thus obtained were mixed into 100 parts by weight of a 20% aqueous solution (viscosity: 90 cps.) of polyoxyethylene nonylphenyl ether (HLB 12) and the mixture was heated at 60° C. for about 30 minutes.

Thereby the water-insoluble copolymer became water-soluble and was dissolved into water to give transparent viscous aqueous solution. The viscosity of the aqueous solution thus obtained was 1000 cps. It can be therefore understood that the initial viscosity was extremely increased by production of the water-soluble composition. Furthermore, the transparent viscous aqueous solution thus obtained did not lose its transparency even if it was diluted with water.

COMPARATIVE EXAMPLE 1

With 100 parts by weight of water were mixed 16 parts by weight of the milky white aqueous dispersion of water-insoluble copolymer obtained in the same manner as described in Example 1 and the mixture was heated at 60° C. for about 30 minutes. The aqueous dispersion was dispersed uniformly, but the solution thereof was still milky white and did not become transparent, its viscosity being 40 cps.

EXAMPLE 2

64 parts by weight of the milky white aqueous dispersion of water-insoluble copolymer obtained in the same manner as described in Example 1 were mixed into 100 parts by weight of a 20% aqueous solution (viscosity: 80 cps.) of polyoxyethylene oleyl ether (HLB 16) and the mixture was heated at 60° C. for about 30 minutes.

Thereby, the water-insoluble copolymer became water-soluble and was dissolved into water to give a transparent viscous aqueous solution. The viscosity of the aqueous solution thus obtained was 5800 cps. It can be therefore understood that the viscosity was extremely increased by production of the water-soluble composition. Furthermore, the transparent viscous aqueous solution thus obtained did not lose its transparency even when it was diluted with water.

EXAMPLE 3

16 parts by weight of the milky white aqueous dispersion of water-insoluble copolymer obtanied in the same manner as described in Example 1 were mixed into 100 parts by weight of a 20% aqueous solution (viscosity: 110 cps.) of 12 parts by weight of a block copolymer of polyoxyethylene and polyoxypropylene (HLB 4) and 8 parts by weight of sodium dodecylbenzene sulfonate and the mixture was heated at 60° C. for about 30 minutes.

Thereby, the water-insoluble copolymer became water-soluble and was dissolved into water to give a transparent viscous aqueous solution. The viscosity of the aqueous solution thus obtained was 8600 cps. It can be therefore understood that the viscosity was extremely increased by production of the water-soluble composition. Furthermore, the transparent viscous aqueous solution thus obtained did not lose its transparency even when it was diluted with water.

EXAMPLE 4

16 parts by weight of the milky white aqueous dispersion of water-insoluble copolymer obtained in the same manner as described in Example 1 were mixed into 100 parts by weight of a 20% aqueous solution (viscosity: 610 cps.) of 16 parts by weight of polyoxyethylene sorbitan monooleyl ester (HLB 15) and 4 parts by weight of lauryl trimethyl ammonium chloride and the mixture was heated at 60° C. for about 30 minutes.

Thereby, the water-insoluble copolymer became water-soluble and was dissolved into water to give a transparent viscous aqueous solution. The viscosity of the aqueous solution thus obtained was 3600 cps. It can be therefore understood that the initial viscosity was extremely increased by production of the water-soluble composition. Furthermore, the transparent viscous aqueous solution thus obtained did not lose its transparency even when it was diluted with water.

EXAMPLE 5

16 parts by weight of a milky white aqueous dispersion of water-insoluble copolymer, which has a concentration of 25% by weight and a pH value of 8, obtained by emulsion-polymerizing 92 parts by weight of ethyl acrylate and 8 parts by weight of methacrylic acid in the presence of 7 parts by weight of polyvinyl alcohol were mixed into 100 parts by weight of a 20% aqueous solution (viscosity: 90 cps.) of polyoxyethylene nonylphenyl ether (HLB 12) and the mixture was agitated at room temperature for 30 minutes.

Thereby, the water-insoluble copolymer became water-soluble and was dissolved into water to give a transparent viscous aqueous solution. The viscosity of the aqueous solution thus obtained was 2000 cps. It can be therefore understood that the initial viscosity was extremely increased by production of the water-soluble composition. Furthermore, the transparent viscous aqueous solution thus obtained did not lose its transparency even when it was diluted with water.

COMPARATIVE EXAMPLE 2

16 parts by weight of a milky white aqueous dispersion of water-insoluble copolymer, which has a concentration of 25% by weight and a pH value of 8, obtained by emulsion-polymerizing 100 parts by weight of ethyl acrylate in the presence of 7 parts by weight of polyvinyl alcohol were mixed into 100 parts by weight of a 20% aqueous solution (viscosity: 90 cps.) of polyoxyethylene nonylphenyl ether (HLB 12) and the mixture was heated at 60° C. for 3 hours.

The mixture thus obtained was milky white and opaque, and any water-soluble composition was not obtained. Furthermore, the viscosity was as low as 300 cps.

COMPARATIVE EXAMPLE 3

16 parts by weight of a milky white aqueous dispersion of water-insoluble copolymer, which has a concentration of 25% by weight and a pH value of 8, obtained by emulsion-polymerizing 100 parts by weight of ethyl acrylate in the presence of 7 parts by weight of polyoxyethylene laurylphenyl ether (HLB 16) were mixed into 100 parts by weight of a 20% aqueous solution (viscosity: 90 cps.) of polyoxyethylene nonylphenyl ether (HLB 12) and the mixture was heated at 60° C. for 3 hours.

The mixture thus obtained was milky white and opaque, and the viscosity was lower by as much as 50 cps. in comparison with that of an aqueous solution of a nonionic surface active agent. A water-soluble composition was not obtained.

EXAMPLE 6

16 parts by weight of a milky white aqueous dispersion of water-insoluble copolymer, which has a concentration of 25% by weight and a pH value of 7, obtained by emulsion-polymerizing 20 parts by weight of ethylene, 74 parts by weight of vinyl acetate and 6 parts by weight of acrylic acid in the presence of sodium laurylsulfate were mixed into 100 parts by weight of a 20% of polyoxyethylene nonylphenyl ether (HLB 8) and to the mixture were added 80 parts by weight of water, and then the mixture was agitated at 60° C. for about 60 minutes.

Thereby, the water-insoluble copolymer became water-soluble and was dissolved into water to give a transparent viscous aqueous solution. The viscosity of the aqueous solution thus obtained was 1400 cps., and the aqueous solution did not lose its transparency even when it was diluted with water.

COMPARATIVE EXAMPLE 4

16 parts by weight of a milky white aqueous dispersion of water-insoluble copolymer obtained by emulsion-polymerizing 20 parts by weight of ethylene and 80 parts by weight of vinyl acetate in the same manner as described in Example 6 instead of the aqueous dispersion of copolymer of ethylene, vinyl acetate and acrylic acid were mixed into 100 parts of the same aqueous solution of a nonionic surface active agent as in Example 6 and the mixture was heated at 60° C. for 60 minutes.

The mixture thus obtained was milky white and opaque, and the viscosity was 230 cps. which is approximately the same as that of the aqueous solution of the nonionic surface active agent. A water-soluble composition was not obtained.

EXAMPLE 7

32 parts by weight of a milky white aqueous dispersion of water-insoluble copolymer, which has a concentration of 25% by weight and a pH value of 8, obtained by emulsion-polymerizing 50 parts by weight of butyl acrylate, 44 parts by weight of vinyl acetate and 6 parts by weight of methacrylic acid in the presence of polyvinyl alcohol were mixed into 100 parts by weight of a 20% aqueous solution of polyoxyethylene oleyl ester (HLB 10) and the mixture was heated at 60° C. for about 30 minutes.

Thereby, the water-insoluble copolymer became water-soluble and was dissolved into water to give a transparent viscous aqueous solution. The viscosity of the aqueous solution thus obtained was 28,000 cps., and the aqueous solution did not lose its transparency even when it was diluted with water.

EXAMPLE 8

4 parts by weight of a milky white aqueous dispersion of water-insoluble copolymer, which has a concentration of 40% by weight and a pH value of 8, obtained by emulsion-polymerizing 71 parts by weight of butyl acrylate, 20 parts by weight of acrylonitrile and 9 parts by weight of acrylic acid in the presence of hydroxyethyl cellulose were mixed into 100 parts by weight of a 20% aqueous solution of 18 parts by weight of polyoxyethylene nonylphenyl ether (HLB 8) and 2 parts by weight of N-tallow-β-aminopropionic acid and the mixture was heated at 60° C. for about 60 minutes.

Thereby, the water-insoluble copolymer became water-soluble and was dissolved into water to give a transparent viscous aqueous solution. The viscosity of the aqueous solution thus obtained was 750 cps., and the aqueous solution did not lose its transparency even when it was diluted with water.

EXAMPLE 9

4 parts by weight of a milky white aqueous dispersion of water-insoluble copolymer, which has a concentration of 40% by weight and a pH value of 8, obtained by emulsion-polymerizing 71 parts by weight of butylacrylate, 20 parts by weight of acrylonitrile and 9 parts by weight of acrylic acid in the presence of sodium polyoxyethylene laurylsulfonate were mixed into 100 parts by weight of a 20% aqueous solution of 18 parts by weight of polyoxyethylene nonylphenyl ether (HLB 8) and 2 parts by weight of N-tallow-β-aminopropionic acid and the mixture was heated at 60° C. for about 60 minutes.

Thereby, the water-insoluble copolymer became water-soluble and was dissolved into water to give a transparent viscous aqueous solution. The viscosity of the aqueous solution thus obtained was 600 cps., and its transparency did not change even when it was diluted with water.

EXAMPLE 10

2 parts by weight of a powdery water-insoluble copolymer obtained by polymerizing 50 parts by weight of styrene, 35 parts by weight of butyl acrylate and 12 parts by weight of acrylic acid were mixed into 100 parts by weight of a 20% aqueous solution of polyoxyethylene nonlyl ether (HLB 8) and to the mixture was added 1.0 part by weight of sodium carbonate, and then the mixture was heated at 70° C. for about 60 minutes.

Thereby, the powdery water-insoluble copolymer became water-soluble and was dissolved into water to give a transparent viscous aqueous solution. The viscosity of the aqueous solution thus obtained was 680 cps., and the aqueous solution did not lose its transparency even if it was diluted with water.

EXAMPLE 11

100 parts by weight of a methanol paste (concentration: 40% by weight) of a water-insoluble copolymer obtained by polymerizing 50 parts by weight of ethyl acrylate, 41 parts by weight of methyl methacrylate, 6 parts by weight of methacrylic acid and 3 parts by weight of monobutyl maleate were mixed into 200 parts by weight of a 50% ethyl acetate solution of polyoxyethylene isobutylphenyl ether (HLB 12) and to the mixture was added about 10 parts by weight of 10 N aqueous sodium hydroxide solution, and then the mixture was heated at 60° C. for about 10 minuxtes.

Thereby, the water-insoluble copolymer became a water-soluble composition and any precipitate of the copolymer or any turbidity of the solution did not appear even when the solvent solution of the water-soluble composition was diluted with water in any proportion.

EXAMPLE 12

16 parts by weight of a filmy water-insoluble copolymer obtained by polymerizing 95 parts by weight of vinyl acetate and 5 parts by weight of crotonic acid were mixed into 100 parts by weight of a 40% solution of polyoxyethylene stearyl ether (HLB 14) in a mixed solvent (65 parts by weight of acetone, 3 parts by weight of water and 0.5 part by weight of potassium hydroxide) and the mixture was heated at 70° C. for about 60 minutes.

Thereby, the filmy water-insoluble copolymer was gradually dissolved into the nonionic surface active agent solution to give a transparent solution of a water-soluble composition. Any precipitate of the copolymer or any turbidity of the solution did not appear even when the solvent solution of the water-soluble composition was diluted with water in any proportion.

EXAMPLE 13

4 parts by weight of a powdery water-insoluble copolymer obtained by polymerizing 95 parts by weight of vinyl acetate and 5 parts by weight of crotonic acid, 10 parts by weight of a powdery polyoxyethylene-polyoxypropylene block copolymer and 1 part of sodium carbonate were uniformly mixed to give a water-soluble composition. 15 parts by weight of the water-soluble composition thus obtained were added in 150 parts by weight of water and the mixture was agitated at 70° C. for about 60 minutes. Thereby, the water-soluble composition was dissolved into water to give a transparent solution.

EXAMPLE 14

20 parts by weight of a milky white aqueous dispersion of water-insoluble copolymer, which has a concentration of 50% by weight and a viscosity of 10,000 cps., obtained by polymerizing a mixed monomer of 95 parts by weight of vinyl acetate and 5 parts by weight of crotonic acid in the presence of polyvinyl alcohol as a protective colloid were mixed with 100 parts by weight of a 10% aqueous solution of lauryltrimethylammonium chloride (cationic surface active agent) and the mixture was regulated into pH 7 with an alkali.

Thereby, the water-insoluble polymer became water-soluble and was dissolved into water to give a transparent viscous aqueous solution. The viscosity of the aqueous solution was 120 cps.

COMPARATIVE EXAMPLE 5

20 parts by weight of the same aqueous dispersion of polymer as in Example 14 were mixed into 100 parts by weight of water and the mixture was regulated into pH 7.

Thereby, it was uniformly dispersed as it is milky white, but the dispersion thus obtained was not transparent and the viscosity of the dispersion was as low as 20 cps.

COMPARATIVE EXAMPLE 6

20 parts by weight of a milky white aqueous dispersion of water-insoluble copolymer, which has a concentration of 50% by weight and a viscosity of 10,000 cps., obtained by polymerizing vinyl acetate in the presence of polyvinyl alcohol as a protective colloid were mixed with 100 parts by weight of a 10% aqueous solution of lauryl-trimethylammonium chloride (cationic surface active agent) and the mixture was regulated into pH 7.

Thereby, it was not dissolved and crude particles appeared. The viscosity of the supernatant was less than 6 cps.

EXAMPLE 15

30 parts by weight of a milky white aqueous dispersion of water-insoluble copolymer, which has a concentration of 50% by weight, obtained by polymerizing a mixed monomer of 46 parts by weight of ethyl acrylate, 50 parts by weight of vinyl acetate and 4 parts by weight of acrylic acid in the presence of polyvinyl alcohol as a protective colloid were mixed with 100 parts by weight of a 10% aqueous solution of lauryl-triethylammonium chloride (cationic surface active agent) and the mixture was regulated into pH 7.

Thereby, the polymer became water-soluble and was dissolved into water to give a transparent viscous aqueous solution.

EXAMPLE 16

40 parts by weight of a milky white aqueous dispersion of water-insoluble copolymer, which has a concentration of 25% by weight and a pH value of 8, obtained by polymerizing a mixed monomer of 94 parts by weight of ethyl acrylate and 6 parts by weight of methacrylic acid in the presence of sodium laurylsulfate (anionic surface active agent) as an emulsifier were mixed with 100 parts by weight of a 10% aqueous solution of lauryl-trimethylammonium chloride (cationic surface active agent).

Thereby, the polymer became water-soluble and was dissolved into water to give a transparent viscous aqueous solution.

EXAMPLE 17

4 parts by weight of a milky white aqueous dispersion of water-insoluble copolymer, which has a concentration of 50% by weight, obtained by polymerizing a mixed monomer of 50 parts by weight of butyl acrylate, 44 parts by weight of methyl methacrylate and 6 parts by weight of itaconic acid in the presence of polyacrylamide as a protective colloid were mixed with 100 parts by weight of a 10% aqueous solution of lauryl-triethylammonium chloride (cationic surface active agent) and the mixture was regulated into pH 8.

Thereby, the polymer became water-soluble and was dissolved into water to give a transparent aqueous solution.

EXAMPLE 18

4 parts by weight of a milky white aqueous dispersion of water-insoluble copolymer, which has a concentration of 50% by weight, obtained by polymerizing a mixed monomer of 50 parts by weight of butyl acrylate, 44 parts by weight of methyl methacrylate and 6 parts by weight of itaconic acid in the presence of sodium laurylsulfate as an emulsifier were mixed with 100 parts by weight of a 10% aqueous solution of lauryl-triethylammonium chloride (cationic surface active agent) and the mixture was regulated into pH 8.

Thereby, the polymer became water-soluble and was dissolved into water to give a semi-transparent aqueous solution.

EXAMPLE 19

10 parts by weight of a milky white aqueous dispersion (concentration: 50% by weight) of water-insoluble copolymer obtained by polymerizing a mixed monomer of 91 parts by weight of ethyl acrylate, 6 parts by weight of methacrylic acid and 3 parts by weight of N-methylol acrylamide in the presence of polyvinyl alcohol as a protective colloid were mixed with 100 parts by weight of a 10% aqueous solution of stearyl-trimethylammonium chloride (cationic surface active agent) and the mixture was regulated into pH 9.

Thereby, the polymer became water-soluble and was dissolved into water to give a transparent viscous aqueous solution.

EXAMPLE 20

10 parts by weight of a milky white aqueous dispersion (concentration: 50%) of water-insoluble copolymer obtained by using glycidyl methacrylate instead of N-methylol acrylamide in Example 19 were mixed with 100 parts by weight of a 10% aqueous solution of stearyl-trimethylammonium chloride (cationic surface active agent) and the mixture was regulated into pH 9.

Thereby, a transparent viscous aqueous solution was obtained the same as in Example 19.

EXAMPLE 21

6 parts by weight of a 30% methanol solution of a polymer obtained by polymerizing 95 parts by weight of vinyl acetate and 5 parts by weight of crotonic acid were mixed with 100 parts by weight of a 10% aqueous solution of lauryl-trimethylammonium chloride (cationic surface active agent) and the mixture was regulated into pH 9.

Thereby, the polymer became water-soluble and was dissolved into water to give a transparent aqueous solution without any precipitation of the polymer.

EXAMPLE 22

2 parts by weight of a powdery polymer obtained by drying and pulverizing the same 30% methanol solution of a polymer as in Example 21 were mixed with 100 parts by weight of a 10% aqueous solution of lauryl-trimethylammonium chloride (cationic surface active agent) and the mixture was regulated into pH 9.

Thereby, the polymer because water-soluble and was dissolved into water to give a transparent aqueous solution.

EXAMPLE 23

2 parts by weight of a powdery polymer obtained by drying and pulverizing the same 30% methanol solution of a polymer as in Example 21, 10 parts by weight of lauryl-trimethylammonium chloride and 0.5 part by weight of sodium hydroxide were added in 100 parts by weight of methanol.

Thereby, the polymer was dissolved to give a transparent solution. 10 parts by weight of the solution thus obtained could be diluted with 100 parts by weight of water without any precipitate of the polymer.

EXAMPLE 24

10 parts by weight of a milky white aqueous dispersion (concentration: 50%) of water-insoluble copolymer obtained by polymerizing a mixed monomer of 50 parts by weight of vinyl acetate, 45 parts by weight of ethylene and 5 parts by weight of crotonic acid in the presence of hydroxyethyl cellulose as a protective colloid were mixed with 100 parts by weight of a 10% aqueous solution of stearyl-trimethylammonium chloride (cationic surface active agent) and the mixture was regulated into pH 6.

Thereby, the polymer became water-soluble and was dissolved into water to give a transparent viscous aqueous solution.

EXAMPLE 25

5 parts by weight of a milky white aqueous dispersion (concentration: 50%) of water-insoluble copolymer obtained by polymerizing a mixed monomer of 44 parts by weight of vinyl acetate, 50 parts by weight of vinyl chloride and 6 parts by weight of acrylic acid in the presence of polyvinyl alcohol as a protective colloid were mixed with 100 parts by weight of a 10% aqueous solution of lauryl-trimethylammonium chloride (cationic surface active agent) and the mixture was regulated into pH 7.

Thereby, the polymer became water-soluble and was dissolved into water to give a transparent viscous aqueous solution.

EXAMPLE 26

5 parts by weight of a milky white aqueous dispersion (concentration: 50%) of water-insoluble copolymer obtained by polymerizing a mixed monomer of 65 parts by weight of styrene, 25 parts by weight of acrylonitrile and 10 parts by weight of acrylic acid in the presence of polyethyleneoxide sodium laurylsulfonate as an emulsifier were mixed with 100 parts by weight of a 10% aqueous solution of lauryl-trimethylammonium chloride (cationic surface active agent) and the mixture was regulated into pH 7.

Thereby, the polymer became water-soluble and was dissolved into water to give a viscous aqueous solution.

EXAMPLE 27

8 parts by weight of a milky white aqueous dispersion (concentration: 50% by weight, viscosity: 10,000 cps., pH: 7) of water-insoluble copolymer obtained by polymerizing a mixed monomer of 95 parts by weight of vinyl acetate and 5 parts by weight of crotonic acid in the presence of polyvinyl alcohol as a protective colloid were mixed with agitation with 100 parts by weight of a 10% aqueous solution (viscosity: 450 cps.) of N-tallow-$\beta$-aminopropionic acid (amphoteric surface active agent) and the mixture was regulated into pH 7.

Thereby, the water-insoluble polymer became water-soluble and was dissolved into water to give a transparent viscous aqueous solution. The viscosity of the aqueous solution was 100 cps.

COMPARATIVE EXAMPLE 7

8 parts by weight of a milky white aqueous dispersion (concentration: 50% by weight, viscosity: 10,000 cps.) of water-insoluble polymer obtained by polymerizing vinyl acetate in the presence of polyvinyl alcohol as a protective colloid were mixed with agitation with 100 parts by weight of 10% aqueous solution of N-tallow-$\beta$-aminopropionic acid (amphoteric surface active agent) and the mixture was regulated into pH 7.

Thereby, a milky white mixture was obtained and the viscosity of the mixture was 450 cps.

EXAMPLE 28

15 parts by weight of the same milky white aqueous dispersion as in Example 27 were mixed with agitation with 100 parts by weight of the same aqueous solution of amphoteric surface active agent as in Example 27 and the mixture was regulated into pH 7.

Thereby, the water-insoluble polymer became water-soluble and was dissolved into water to give a transparent aqueous solution. The viscosity of the aqueous solution was 200 cps.

EXAMPLE 29

8 parts by weight of a milky white aqueous dispersion (concentration: 46% by weight, viscosity: 100 cps., pH: 7) of water-insoluble polymer obtained by polymerizing a mixed monomer of 19 parts by weight of vinyl acetate, 75 parts by weight of ethyl acrylate and 6 parts by weight of acrylic acid in the presence of sodium laurylsulfate as an emulsifier were mixed with agitation with 100 parts by weight of a 10% aqueous solution of monosodium N-coco-$\beta$-iminodipropionate (amphoteric surface active agent).

Thereby, the water-insoluble polymer became water-soluble and was dissolved into water to give a transparent viscous aqueous solution. The viscosity of the aqueous solution was 125 cps.

EXAMPLE 30

4 parts by weight of a milky white aqueous dispersion (concentration: 46% by weight, viscosity: 20,000 cps., pH: 6) of water-insoluble polymer obtained by polymerizing a mixed monomer of 50 parts by weight of methyl acrylate, 44 parts by weight of methyl methacrylate and 6 parts by weight of methacrylic acid in the presence of polyvinyl alcohol as a protective colloid were mixed with agitation with 100 parts by weight of a 10% aqueous solution of sodium N-methyloleyltaurine (amphoteric surface active agent).

Thereby, the water-insoluble polymer became water-soluble and was dissolved into water to give a transparent viscous aqueous solution. The viscosity of the aqueous solution was 200 cps.

EXAMPLE 31

4 parts by weight of a milky white aqueous dispersion (concentration: 46% by weight, viscosity: 5000 cps., pH: 6) of water-insoluble polymer obtained by polymerizing a mixed monomer of 50 parts by weight of methyl acrylate, 44 parts by weight of methyl methacrylate and 6 parts by weight of methacrylic acid in the presence of polyoxyethylene sodium laurylsulfonate as an emulsifier were mixed with agitation with 100 parts by weight of a 10% aqueous solution of sodium N-methyl-oleyltaurine (amphoteric surface active agent).

Thereby, the water-insoluble polymer became water-soluble and was dissolved into water to give a semi-transparent viscous aqueous solution. The viscosity of the aqueous solution was 150 cps.

EXAMPLE 32

8 parts by weight of a milky white aqueous dispersion (concentration: 50% by weight) of water-insoluble polymer obtained by polymerizing a mixed monomer of 91 parts by weight of ethyl acrylate, 6 parts by weight of methacrylic acid and 3 parts by weight of N-methylol acrylamide in the presence of polyvinyl alcohol as a protective colloid were mixed with agitation with 100 parts by weight of a 10% aqueous solution of N-coco-$\beta$-aminopropionic acid (amphoteric surface active agent) and the mixture was regulated into pH 9.

Thereby, the water-insoluble polymer became water-soluble and was dissolved into water to give a transparent viscous aqueous solution.

EXAMPLE 33

4 parts by weight of a milky white aqueous dispersion (concentration: 50% by weight) of water-insoluble polymer obtained by polymerizing a mixed monomer of 50 parts by weight of methyl methacrylate, 44 parts by weight of butyl acrylate and 6 parts by weight of itaconic acid in the presence of polyacrylamide as a protective colloid were mixed with agitation with 100 parts by weight of a 10% aqueous solution of sodium N-coco-$\beta$-aminopropionate (amphoteric surface active agent).

Thereby, the water-insoluble polymer became water-soluble and was dissolved into water to give a transparent viscous aqueous solution.

EXAMPLE 34

8 parts by weight of a 10% methanol solution of a polymer obtained by polymerizing 95 parts by weight of vinyl acetate and 5 parts by weight of crotonic acid were mixed with agitation with 100 parts by weight of a 10% aqueous solution of sodium N-tallow-$\beta$-aminopropionate (amphoteric surface active agent).

Thereby, the polymer became water-soluble and was dissolved into water to give a transparent aqueous solution without any precipitate of the polymer.

EXAMPLE 35

2 parts by weight of a powdery polymer obtained by drying and pulverizing the same 10% methanol solution of a polymer as in Example 34 were mixed with agitation with 100 parts by weight of a 10% aqueous solution of monosodium N-coco-β-iminodipropionate (amphoteric surface active agent).

Thereby, the polymer became water-soluble and was dissolved into water to give a transparent aqueous solution.

EXAMPLE 36

2 parts by weight of a powdery polymer obtained by drying and pulverizing the same 10% methanol solution of a polymer as in Example 34 were mixed with 10 parts by weight of monosodium N-coco-β-iminodipropionate (amphoteric surface active agent) and the mixture was added to 100 parts by weight of methanol.

Thereby, the polymer was dissolved to give a transparent solution. 10 parts by weight of the solution thus obtained could be diluted with 100 parts by weight of water without any precipitation of the polymer.

EXAMPLE 37

4 parts by weight of a milky white aqueous dispersion (concentration: 50% by weight) of water-insoluble polymer obtained by polymerizing a mixed monomer of 80 parts by weight of vinyl acetate, 15 parts by weight of ethylene and 5 parts by weight of crotonic acid in the presence of hydroxyethyl cellulose as a protective colloid were mixed with agitation with 100 parts by weight of a 10% aqueous solution of N-tallow-β-aminopropionic acid (amphoteric surface active agent) and the mixture was regulated into pH 8.

Thereby, the water-insoluble polymer became water-soluble and was dissolved into water to give a transparent aqueous solution.

EXAMPLE 38

2 parts by weight of a milky white aqueous dispersion (concentration: 50% by weight) of water-insoluble polymer obtained by polymerizing a mixed monomer of 44 parts by weight of vinyl acetate, 50 parts by weight of vinyl chloride and 6 parts by weight of acrylic acid in the presence of polyvinyl alcohol as a protective colloid were mixed with agitation with 100 parts by weight of a 10% aqueous solution of sodium N-methyl-oleyltaurine (amphoteric surface active agent).

Thereby, the water-insoluble polymer became water-soluble and was dissolved into water to give a transparent aqueous solution.

EXAMPLE 39

1 part by weight of a milky white aqueous dispersion (concentration: 50% by weight) of water-insoluble polymer obtained by polymerizing a mixed monomer of 65 parts by weight of styrene, 25 parts by weight of acrylnitrile and 10 parts by weight of acrylic acid in the presence of sodium lauryl-sulfate was mixed with agitation with 100 parts by weight of a 10% aqueous solution of sodium N-methyl-oleyltaurine (amphoteric surface active agent).

Thereby, the water-insoluble polymer became water-soluble and was dissolved into water to give a transparent aqueous solution.

COMPARATIVE TEST 1

In view of the velocity of compatibility with the surface active agent, the transparency of the aqueous composition and the solubility of the film of the composition, the compositions prepared from a dispersion obtained by using a protective colloid (Examples 5, 8, 14, 17 and 30) or a surface active agent (Examples 1, 9, 18, 21 and 31) as an emulsifier were compared. Those of the compositions prepared in Examples 5, 8, 14, 17 and 30 were superior to those of the compositions prepared in Examples 1, 9, 18, 21 and 31, as shown below.

The composition in Example 5 showed larger velocity of compatibility with the surface active agent and solubility of the film of the composition in comparison with that in Example 1.

The compostion in Example 8 showed better transparency of the aqueous composition than that in Example 9.

The composition in Example 17 showed larger velocity of compatibility with the surface active agent and superior transparency of the aqueous composition in comparison with that in Example 18.

The composition Example 14 showed superior solubility of the film of the composition to that in Example 21.

The composition in Example 30 showed larger velocity of compatibility with the surface active agent and superior transparency of the aqueous composition in comparison with that in Example 31.

The following Examples 40 to 50 concern adhesives, Examples 40 to 45 illustrating those which are easily soluble in water and Examples 46 to 50 illustrating those which are able to be dispersed in water or to be swollen with water.

EXAMPLE 40

400 parts by weight of a 40% methanol solution of a vinyl acetate-crotonic acid copolymer (content of crotonic acid: 8% by mole, degree of polymerization: 1000) were heated at 60° C. and to the solution was gradually added with agitation a solution of 100 parts by weight of polyethyleneglycol nonylphenyl ether (number of ethyleneglycol molecule: 10) (nonionic surface active agent) in 150 parts by weight of methanol and then further with a solution of 2 parts by weight of sodium hydroxide in 8 parts by weight of water and the mixture was further heated at 60° C. for 1 hour.

Thereby, a uniform hydrophilic adhesive was obtained.

EXAMPLE 41

500 parts by weight of a 20% aqueous solution of a vinyl acetate-itaconic acid copolymer (content of itaconic acid: 30% by mole, degree of polymerization: 500) were heated at 70° C. and to the solution was gradually added with agitation 100 parts by weight of polyethyleneglycol sorbitan monooleate (number of ethyleneglycol molecule: 10). After adding the nonionic surface active agent, 20 parts by weight of urea were added to the mixture, and then the mixture was further agitated at 70° C. for 1 hour.

Thereby, a uniform hydrophilic adhesive was obtained.

EXAMPLE 42

500 parts by weight of 40% methanol-toluene solution of an ethyl acrylate-acrylic acid copolymer (content of acrylic acid: 15% by mole, degree of polymerization: 2000) were heated at 60° C. and to the solution was gradually added with agitation a solution of 100 parts by weight of polyethylene-glycol lauryl ether (number of ethyleneglycol molecule: 6) (nonionic surface active agent) in 100 parts by weight of water. After adding the nonionic surface active agent, 1 part by weight of sodium hydroxide was added to the mixture, and then the mixture was further agitated at 70° C. for 1 hour.

Thereby, a uniform hydrophilic adhesive was obtained.

EXAMPLE 43

230 parts by weight of 30% aqueous dispersion of butyl acrylate-methyl methacrylate-methacrylic acid copolymer (content of methyl methacrylate: 30% by mole, content of methacrylic acid: 12% by mole, degree of polymerization: 1000) were mixed with 140 parts by weight of ethyl acetate and 2 parts by weight of trimethanolamine and the mixture was heated at 60° C. To the mixture were gradually added with agitation 100 parts by weight of a block polymer of polyethyleneglycol and polypropyleneglycol (content of ethyleneglycol: 40 to 50% by mole, molecular weight of polypropyleneglycol: 1500 to 1800). After adding the nonionic surface active agent, 20 parts by weight of a 20% aqueous solution of poly(sodium acrylate) (degree of polymerization: 2700 to 7500) were added to the mixture, and then the mixture was further agitated at 60° C. for 1 hour.

Thereby, a uniform hydrophilic adhesive was obtained.

EXAMPLE 44

200 parts by weight of a 50% aqueous dispersion of a butyl acrylate-acrylnitrile-acrylic acid copolymer (content of acrylonitrile: 20% by mole, content of acrylic acid: 20% by mole, degree of polymerization: 1500) were heated at 70° C. To the mixture was gradually added with agitation a solution of 100 parts by weight of a nonionic surface active agent of the formula:

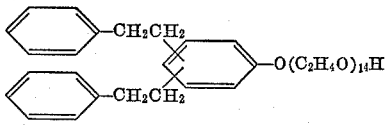

in 100 parts by weight of acetone and 100 parts by weight of methanol. After adding the nonionic surface active agent, 3 parts by weight of 28% aqueous ammonia, 15 parts by weight of urea and 10 parts by weight of 10% aqueous solution of polyvinyl alcohol were added to the mixture, and then the mixture was agitated at 70° C. for 1 hour.

Thereby, a uniform hydrophilic adhesive was obtained.

EXAMPLE 45

300 parts by weight of a 50% aqueous dispersion of an ethylene-vinyl acetate-acrylic acid copolymer (content of ethylene: 40% by mole, content of acrylic acid: 12% by mole) were mixed with 50 parts by weight of a solution of 150 parts by weight of "GANTLEZ AN-139" (trade name of a methyl vinyl ether-maleic anhydride copolymer made by General Aniline and Film Corporation) in 100 parts by weight of methanol and 50 parts by weight of toluene and the mixture was heated at 60° C. To the mixture were gradually added with agitation 60 parts by weight of polyethyleneglycol laurylphenyl ether (number of ethyleneglycol molecule: 3) and 40 parts by weight of polyethyleneglycol laurylphenyl ether (number of ethyleneglycol molecule: 40). After adding the nonionic surface active agent, 20 parts by weight of sodium hydroxide were added to the mixture, and then the mixture was agitated at 60° C. for 1 hour.

Thereby, a hydrophilic adhesive was obtained.

EXAMPLE 46

400 parts by weight of a 50% solution of a ethyl acrylate-itaconic acid copolymer (content of itaconic acid: 6% by mode, degree of polymerization: 2000) in ethyl acetate-acetone mixed solvent (1:1 by weight) were heated at 60° C. To the solution were gradually added with agitation 100 parts by weight of polyethyleneglycol laurylphenyl ether (number of ethyleneglycol molecule: 15) and then the mixture was further agitated at 60° C. for 1 hour.

Thereby, a uniform hydrophilic adhesive was obtained.

EXAMPLE 47

200 parts by weight of a 40% solution of a butyl acrylate-methyl methacrylate-methacrylic acid copolymer (content of methyl methacrylate: 50% by mole, content of methacrylic acid: 3% by mole, degree of polymerization: about 500) in toluene were added to 100 parts by weight of methanol and the mixture was heated at 60° C. To the mixture were gradually added with agitation 100 parts by weight of polyethyleneglycol t-butylphenyl ether (number of ethyleneglycol molecule: 6) and then the mixture was further agitated at 60° C. for 1 hour.

Thereby, a uniform hydrophilic adhesive was obtained.

EXAMPLE 48

250 parts by weight of a 40% aqueous dispersion of a vinyl acetate-vinyl chloride-acrylic acid copolymer (content of vinyl chloride: 50% by mole, content of acrylic acid: 12% by mole, degree of polymerization: about 1000) were heated at 60° C. To the mixture were gradually added with agitation to a solution of 100 parts by weight of a nonionic surface active agent of the formula:

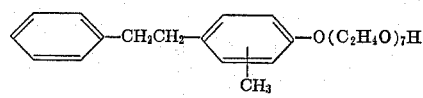

in 150 parts by weight of methanol. After adding the nonionic surface active agent, 7 parts by weight of 28% aqueous ammonia were added and then the mixture was further agitated at 60° C. for 1 hour.

Thereby, a uniform hydrophilic adhesive was obtained.

EXAMPLE 49

200 parts by weight of a 50% ethyl acetate paste of an ethyl acrylate-vinyl acetate-methacrylic acid copolymer (content of vinyl acetate: 20% by mole, content of methacrylic acid: 12% by mole, degree of polymerization: about 3000) were heated at 60° C. To the mixture were gradually added with agitation a solution of 100 parts by weight of polyethyleneglycol lauryl ether (number of ethyleneglycol molecule: 15) in 100 parts by weight of water. After adding the nonionic surface active agent, 2 parts by weight of potassium hydroxide and 10 parts by weight of zinc acetate were added and then the mixture was further agitated at 60° C. for 1 hour.

Thereby, a uniform hydrophilic adhesive was obtained.

EXAMPLE 50

100 parts by weight of a 40% aqueous dispersion of an ethylene-vinyl acetate-acrylic acid copolymer (content of ethylene: 20% by mole, content of acrylic acid: 6% by mole) were mixed with 150 parts by weight of a 50% methanol solution of polyethyleneglycol laurylphenyl ether (number of ethyleneglycol: 50) and 50 parts by weight of methanol and the mixture was agitated at 70° C. for about 1 hour.

Thereby, a uniform hydrophilic adhesive was obtained.

COMPARATIVE EXAMPLE 8

In the same manner as described in Example 40 excepting no use of polyethyleneglycol nonylphenyl ether, a composition was obtained.

COMPARATIVE EXAMPLE 9

In the same manner as described in Example 40, by using a 40% methanol solution of a vinyl acetate polymer (degree of polymerization: 1000) instead of the 40% methanol solution of a vinyl acetate-crotonic acid copolymer in Example 40, a composition was obtained.

COMPARATIVE EXAMPLE 10

In the same manner as described in Example 42, by using a 40% solution of an ethyl acrylate-acrylic acid copolymer (content of acrylic acid: 80% by mole, degree of polymerization: 2000) in a methanol-toluene mixed solvent instead of the 40% solution of an ethyl acrylate-acrylic acid copolymer (content of acrylic acid: 15% by mole, degree of polymerization: 2000), a composition was obtained.

COMPARATIVE TEST 2

The hydrophilic adhesives obtained in Examples 40 to 50 and the compositions obtained in Comparative Examples 8 to 10 were coated on a high quality paper so as to have thickness of 0.05 mm. (as solid), and the coated paper was allowed to stand at 20° C., 65% RH for 24 hours to give samples of pressure-sensitive paper. These samples were subjected to the following adhesive strength, tackiness and cohesive strength tests. Since the adhesive obtained in Example 50 is a heat-sensitive one, it was tested at 70° C.

The test results are shown in Table 1.

Adhesive strength (tensility test at 180° C.)

A slender sample having a width of 25 cm. was put on a stainless steel plate (SUS 27) and pressed in a length of only 5 cm. of the sample. After 10 minutes, the resultant sample was subjected to the tensility test at 180° C. at a velocity of load of 250 mm./minute by using a tensile tester.

Tackiness (J. Dow: ball rolling method)

A sample having a constant length was fixed on a slanting surface having an angle of 30°. 32 kinds of steel balls having a diameter of 1/32 inch to 1 inch were rolled on the surface from a constant height. The tackiness was shown by the ball No. of the largest ball which stopped on the surface of sample.

Cohesive strength (0°, hold method)

A sample was put on a stainless steel plate (SUS 27) and pressed so as to be in adhesion area of 2.5 cm. x 1.25 cm. On one end of the sample was added downward a load of 1,000 g. and the period till the sample slipped down was measured.

TABLE 1

| Example No.: | Adhesive strength (g./25 cm.) | Tackiness (Ball No.) | Cohesive strength (sec.) |
|---|---|---|---|
| 40 | 1,500 | 13 | 120 |
| 41 | 2,000 | 10 | 200 |
| 42 | 1,400 | 10 | 750 |
| 43 | 1,200 | 9 | 800 |
| 44 | 1,300 | 10 | 600 |
| 45 | 1,800 | 15 | 360 |
| 46 | 900 | 8 | 860 |
| 47 | 1,300 | 10 | 580 |
| 48 | 1,200 | 10 | 750 |
| 49 | 800 | 8 | 1,500 |
| 50* | 300 | 8 | 300 |
| Comparative Example No.: | | | |
| 8 | 0 | 0 | 0 |
| 9 | 0 | 0 | 0 |
| 10 | 100 | 2 | 5 |

*Each value in Example No. 50 was measured at 70° C.

COMPARATIVE TEST 3

The water-solubility or water-dispersibility of the hydrophilic adhesive obtained in Examples 40 to 50, the composition obtained in Comparative Examples 8 to 10 and a marketed pressure-sensitive adhesive (rubber type) were measured.

The test results are shown in Tables 2 and 3.

Water-solubility test

The hydrophilic adhesive or composition was coated on a high quality paper so as to give a thickness of 0.2 mm. (as solid), and the coated paper was allowed to stand at 20° C., 65% RH for 24 hours and then dipped into water of room temperature for 30 minutes.

After dipping, the paper was taken out and observed whether the adhesive or composition was remained or not on the paper.

Remained: O
Not remained: X

Water-dispersibility test

The hydrophilic adhesive or composition was coated on two pieces of filter paper so as to give a thickness of 0.2 mm. (as solid), and the coated papers were adhered and then allowed to stand at 20° C., 65% RH for 24 hours. After the resultant paper was dipped into a large amount of water of room temperature, the agitation was carried out by using a mixer for 10 minutes and then the dispersing state was observed.

Uniformly dispersed: O
Not uniformly dispersed: X

TABLE 2

| Example No.: | Water-solubility |
|---|---|
| 40 | O |
| 41 | O |
| 42 | O |
| 43 | O |
| 44 | O |
| 45 | O |
| Comparative Example No.: | |
| 8 | X |
| 9 | X |
| 10 | X |
| Marketed adhesive | X |

TABLE 3

| Example No.: | Water-dispersibility |
|---|---|
| 46 | O |
| 47 | O |
| 48 | O |
| 49 | O |
| 50 | O |
| Comparative Example No.: | |
| 8 | X |
| 9 | X |
| 10 | O |
| Marketed adhesive | X |

Examples 51 to 56 relate to flocculants.

EXAMPLE 51

12 parts by weight of a milky white aqueous dispersion (concentration: 50% by weight) of water-insoluble copolymer obtained by polymerizing a mixed monomer of 95 parts by weight of vinyl acetate and 5 parts by weight of crotonic acid in the presence of polyvinyl alcohol as a protective colloid were mixed with 100 parts by weight of a 10% aqueous solution of stearyl-trimethylammonium chloride (cationic surface active agent) and the mixture was regulated into pH 8.

Thereby, the water-insoluble polymer became water-soluble and was dissolved in water to give a transparent aqueous solution useful for flocculant.

EXAMPLE 52

30 parts by weight of a milky white aqueous dispersion (concentration: 50% by weight) of water-insoluble copolymer obtained by polymerizing a mixed monomer of 46 parts by weight of ethyl acrylate, 50 parts by weight of vinyl acetate and 4 parts by weight of acrylic acid in the presence of hydroxyethyl cellulose as a protective colloid were mixed with 100 parts by weight of a 10% aqueous solution of stearyl-triethyl-ammonium chloride (cationic surface active agent) and the mixture was regulated into pH 7.

Thereby, the water-insoluble polymer became water-soluble and was dissolved into water to give a transparent aqueous solution useful for flocculant.

EXAMPLE 53

40 parts by weight of a milky white aqueous dispersion (concentration: 10% by weight) of water-insoluble copolymer obtained by polymerizing a mixed monomer of 94 parts by weight of ethyl acrylate and 6 parts by weight of methacrylic acid in the presence of stearyl trimethylammonium chloride (cationic surface active agent) as an emulsifier were mixed with 100 parts by weight of a 10% aqueous solution of stearyl trimethylammonium chloride and the mixture was regulated into pH 7.

Thereby, the water-insoluble polymer became water-soluble and was dissolved into water to give a transparent aqueous solution useful for flocculant.

EXAMPLE 54

4 parts by weight of a milky white aqueous dispersion (concentration: 50% by weight) of water-insoluble copolymer obtained by polymerizing a mixed monomer of 50 parts by weight of butyl acrylate, 44 parts by weight of methyl methacrylate and 6 parts by weight of itaconic acid in the presence of polyacrylamide as a protective colloid were mixed with 100 parts by weight of a 10% aqueous solution of lauryl trimethylammonium chloride and the mixture was regulated to give pH 7.

Thereby, the water-insoluble polymer became water-soluble and was dissolved into water to give a transparent aqueous solution useful for flocculant.

EXAMPLE 55

6 parts by weight of 30% methanol solution of copolymer obtained by polymerizing 95 parts by weight of vinyl acetate and 5 parts by weight of crotonic acid were mixed with 100 parts by weight of a 10% aqueous solution of lauryl trimethylammonium chloride (cationic surface active agent) and the mixture was regulated to give a pH value of 7.

Thereby, the polymer became water-soluble and was dissolved into water without any precipitation to give a transparent aqueous solution useful for flocculant.

EXAMPLE 56

2 parts by weight of a powdery or flaky polymer obtained by polymerizing 95 parts by weight of vinyl acetate and 5 parts by weight of crotonic acid were mixed with 10 parts by weight of lauryl trimethylammonium chloride (cationic surface active agent) and 0.2 part by weight of sodium hydroxide to give a flocculant.

Then, 1 part by weight of the said flocculant was added to 100 parts by weight of water and then agitated to give a transparent aqueous solution.

Such an aqueous solution can be more rapidly prepared without any turbidity by dissolving 1 part by weight of the said flocculant into 10 parts by weight of methanol and then adding the resultant mixture to 100 parts by weight of water.

COMPARATIVE TEST 4

100 cc. of an 3% aqueous suspension of talc were put into a 100 cc. transparent messcylinder, and to the suspension was added the aqueous solution (flocculant) obtained in each Examples 51 to 56 to give a resin concentration of 60 p.p.m. The contents were mixed by turning over the cylinder 10 times. After mixing, the sinking velocity of talc was measured at regular intervals by reading the height of suspending layer.

As a control, the said procedure was repeated except that a poly(sodium acrylate) having a molecular weight of about 2,000,000 (marketed flocculant) was used instead of the said flocculant of examples. Further, blank test was carried out.

It is understood that the larger flocculation effect was obtained as the height of suspending layer lowered.

The test results are shown in Table 4.

TABLE 4

| | Height of suspending layer (cm.) | | | |
|---|---|---|---|---|
| Period (seconds) | 60 | 120 | 180 | 240 |
| Example: | | | | |
| 51 | 33 | 28 | 26 | 26 |
| 52 | 41 | 32 | 30 | 28 |
| 53 | 40 | 32 | 31 | 27 |
| 54 | 35 | 28 | 26 | 26 |
| 55 | 33 | 29 | 27 | 27 |
| 56 | 33 | 29 | 27 | 27 |
| Poly (sodium acrylate) | 98 | 95 | 95 | 94 |
| Blank | 98 | 96 | 95 | 94 |

NOTE.—The added amount of the flocculant was 60 p.p.m. as solid.

COMPARATIVE TEST 5

100 cc. of a 3% aqueous suspension of kaolin were put into a 100 cc. transparent messcylinder, and to the suspension was added the aqueous solution (flocculant) obtained in each of Examples 51 to 56 to give a resin concentration of 60 p.p.m. The contents were mixed by turning over the cylinder 10 times.

After 20 minutes, the supernatant liquid was taken out and then the turbidity was measured by using a photo-electric photometer.

As a control, the said procedure was repeated except that a polyacrylamide having a molecular weight of about 2,000,000 (marketed flocculant) was used instead of the said flocculant of examples. Further, a blank test was carried out.

The turbidity is shown by a ratio of absorbed light.

It is understood that the larger flocculation effect was obtained as the turbidity lowered.

The test results are shown in Table 5.

TABLE 5

| Example No.: | Turbidity, percent |
|---|---|
| 51 | 10 |
| 52 | 12 |
| 53 | 11 |
| 54 | 8 |
| 55 | 9 |
| 56 | 9 |
| Polyacrylamide | 30 |
| Blank | 30 |

NOTE.—The added amount of the flocculant was 20 p.p.m. as solid.

What is claimed is:

1. A polymer complex obtained by reacting
   (a) 5 to 500 parts by weight of a copolymer comprising 99 to 40% by mole of at least one monomer unit of the General Formula I:

$$-\underset{\underset{H}{|}}{\overset{\overset{H}{|}}{C}}-\underset{\underset{R_2}{|}}{\overset{\overset{R_1}{|}}{C}}- \quad (I)$$

wherein $R_1$ is H, Cl or $CH_3$; $R_2$ is H, Cl, $CH_3$, $-OCOR_3$, $-OR_3$, $-COOR_3$, phenyl, tolyl ($CH_3$-substituted phenyl), $-CN$, $-CONH_2$, $-CONHCH_2$, $-CH_2OH$, $-CH_2-CH_2OH$, OH or pyridyl, $R_3$ is an alkyl group having 1 to 8 carbon atoms, and 1 to 60% by mole of at least one monomer unit of the General Formula II:

$$-\underset{\underset{Y}{|}}{\overset{\overset{X}{|}}{C}}-\underset{\underset{COOH}{|}}{\overset{\overset{Z}{|}}{C}}- \quad (II)$$

wherein X, Y and Z are, the same or different, each H, $CH_3$, $-COR_4$ or $-COOH$; $R_4$ is an alkyl group having 1 to 4 carbon atoms, and
   (b) 100 parts by weight of at least one member selected from the group consisting of nonionic, cationic and amphoteric surface active agents.

2. A flocculant of polymer complex obtained by reacting 5 to 80 parts by weight of the copolymer of claim 1 and 100 parts by weight of cationic surface active agent.

3. An adhesive comprising a polymer complex obtained by reacting 5 to 500 parts by weight of the copolymer of claim 1 and 100 parts by weight of nonionic surface active agent having polyoxyethylene unit as a hydrophilic component.

4. A heat-sensitive adhesive comprising a solid polymer complex obtained by reacting 5 to 500 parts by weight of the copolymer of claim 1 and 100 parts by weight of nonionic surface active agent having polyoxyethylene unit as a hydrophilic component.

5. A pressure-sensitive adhesive comprising a viscous solid polymer complex obtained by reacting 5 to 500 parts by weight of the copolymer of claim 1 and 100 parts by weight of nonionic surface active agent having polyoxyethylene unit as a hydrophilic component.

6. A composition according to claim 1, wherein the said polymer having carboxyl group is a copolymer of an unsaturated carboxylic acid and a monomer copolymerizable therewith.

7. A composition according to claim 6, wherein the said unsaturated carboxylic acid is at least one carboxylic acid selected from the group consisting of an unsaturated monocarboxylic acid, unsaturated dicarboxylic acid and half ester thereof.

8. A composition according to claim 1, wherein the said polymer having carboxyl group is one which is obtained by hydrolyzing a copolymer of an unsaturated carboxylic acid and a vinyl ester.

9. A composition according to claim 1, wherein the said polymer having carboxyl group is one which is obtained by hydrolyzing a copolymer of an unsaturated carboxylic acid ester and a monomer having no carboxyl group.

10. A composition according to claim 1, wherein the said polymer having carboxyl group is one which is obtained by emulsion-polymerizing the starting monomer in the presence of at least one water-soluble protective colloid selected from the group consisting of polyvinyl alcohol, polyvinyl pyrrolidone, hydroxylethyl cellulose, polyacrylic acid, polyacrylamide and poly(N-methylol acrylamide).

11. A composition according to claim 1, wherein the said nonionic surface active agent contains polyoxyethylene as its hydrophilic component.

12. A composition according to claim 1, wherein the said cationic surface active agent is of alkyl ammonium chloride type.

13. A composition according to claim 1, wherein the said amphoteric surface active agent is of alkyl-carboxylic acid type.

14. A composition according to claim 1, which comprises 5 to 80 parts by weight of the said polymer and 100 parts by weight of the said nonionic surface active agent.

15. A composition according to claim 1, which comprises 5 to 80 parts by weight of the said polymer and 100 parts by weight of the said cationic surface active agent.

16. A composition according to claim 1, which comprises 5 to 80 parts by weight of the said polymer and 100 parts by weight of the said aamphoteric surface active agent.

17. An adhesive according to claim 3, wherein the said nonionic surface active agent is in a form of solid.

18. An adhesive according to claim 3, wherein the said nonionic surface active agent is in a form of liquid.

19. An adhesive according to claim 3, wherein the said adhesive itself is water-soluble.

20. An adhesive according to claim 3, wherein the said adhesive itself is water-dispersible.

21. An adhesive according to claim 3, wherein the said adhesive has swelling property.

References Cited
UNITED STATES PATENTS

| | | | |
|---|---|---|---|
| 3,489,719 | 1/1970 | Savage | 260—73 |
| 3,634,366 | 1/1972 | Chujo | 260—78.5 |
| 3,457,206 | 6/1969 | Tonner | 260—22 |
| 3,503,916 | 4/1970 | Warson | 260—29.6 |
| 3,268,470 | 8/1966 | Sheers | 260—29.6 |
| 3,491,050 | 1/1970 | Keberle | 260—29.2 |
| 3,463,750 | 8/1969 | Ghosh | 260—22 |
| 3,577,376 | 4/1971 | Lanthier | 260—29.6 |
| 3,567,503 | 3/1971 | Fallwell | 117—115 |
| 3,464,939 | 9/1969 | Westrenan | 260—22 |

ALLAN LIEBERMAN, Primary Examiner
R. ZAITLEN, Assistant Examiner

U.S. Cl. X.R.

260—29.6 H, 29.6 N, 29.6 E, 78.5